US010020699B2

(12) United States Patent
Ishikawa et al.

(10) Patent No.: US 10,020,699 B2
(45) Date of Patent: Jul. 10, 2018

(54) EMBEDDED PERMANENT MAGNET TYPE ELECTRIC MOTOR, COMPRESSOR, AND REFRIGERATION AIR-CONDITIONING DEVICE (71) Applicant: Mitsubishi Electric Corporation, Tokyo (JP)

(72) Inventors: Atsushi Ishikawa, Tokyo (JP); Masahiro Nigo, Tokyo (JP); Kazuchika Tsuchida, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 218 days.

(21) Appl. No.: 14/910,298

(22) PCT Filed: Sep. 25, 2013

(86) PCT No.: PCT/JP2013/075849
§ 371 (c)(1),
(2) Date: Feb. 5, 2016

(87) PCT Pub. No.: WO2015/045027
PCT Pub. Date: Apr. 2, 2015

(65) Prior Publication Data
US 2016/0181877 A1 Jun. 23, 2016

(51) Int. Cl.
*H02K 1/27* (2006.01)
*F25B 1/02* (2006.01)
(Continued)

(52) U.S. Cl.
CPC ............... *H02K 1/276* (2013.01); *F25B 1/04* (2013.01); *F25B 31/026* (2013.01); *H02K 1/2766* (2013.01); *H02K 2213/03* (2013.01)

(58) Field of Classification Search
CPC .. H02K 1/276; H02K 1/2766; H02K 2213/03; F02B 1/04; F25B 131/026
(Continued)

(56) References Cited

U.S. PATENT DOCUMENTS 4,658,165 A * 4/1987 Vanderschaeghe .. H02K 1/2773
310/156.57
5,672,926 A * 9/1997 Brandes ............... H02K 1/2746
174/DIG. 20
(Continued)

FOREIGN PATENT DOCUMENTS

CN 102222995 A 10/2011
JP 58-105779 U 7/1983
(Continued)

OTHER PUBLICATIONS

English machine translation of JP 11187597; Jul. 1999; Asano et al.*
(Continued)

*Primary Examiner* — Bernard Rojas
*Assistant Examiner* — Ahmed Elnakib
(74) *Attorney, Agent, or Firm* — Posz Law Group, PLC (57) ABSTRACT In an interior permanent magnet motor, a plurality of slits are formed between a rotor outer peripheral surface of a rotor and a radially-outer insertion hole contour surface of a magnet insertion hole. Assuming that a total area of the plurality of slits per magnetic pole is represented by Ss, and an area of a region in a rotor core on a radially outer side with respect to the corresponding one magnet insertion hole is represented by Si, the plurality of slits are formed so as to satisfy a relationship of $0.35 \leq Ss/Si \leq 0.5$.

5 Claims, 8 Drawing Sheets (51) Int. Cl.
*F25B 31/02* (2006.01)
*F25B 1/04* (2006.01)

(58) Field of Classification Search
USPC ............ 310/156.53, 156.56, 156.83, 156.57, 310/156.08
See application file for complete search history.

(56) References Cited

U.S. PATENT DOCUMENTS

| | | | | |
|---|---|---|---|---|
| 7,233,090 B2* | 6/2007 | Evans | ...................... | H02K 1/02 310/156.49 |
| 7,282,827 B2* | 10/2007 | Futami | ................... | H02K 1/276 310/156.48 |
| 7,768,172 B2* | 8/2010 | Takahata | .............. | H02K 1/2766 310/156.53 |
| 8,106,557 B2* | 1/2012 | Yoshino | ................. | H02K 1/276 310/156.53 |
| 8,937,420 B2* | 1/2015 | Yabe | ...................... | H02K 29/03 310/156.53 |
| 9,083,218 B2* | 7/2015 | Mathoy | ................ | H02K 1/2766 |
| 9,178,392 B2* | 11/2015 | Yabe | ...................... | H02K 1/2706 |
| 9,496,759 B2* | 11/2016 | Yabe | ...................... | H02K 1/276 |
| 9,634,531 B2* | 4/2017 | Baba | ..................... | H02K 1/276 |
| 9,876,402 B2* | 1/2018 | Tsuchida | .................. | H02K 1/27 |
| 2002/0047434 A1* | 4/2002 | Koharagi | ............. | H02K 1/2766 310/156.56 |
| 2006/0273678 A1* | 12/2006 | Futami | ................... | H02K 1/276 310/156.53 |
| 2007/0252467 A1* | 11/2007 | Hoemann | .............. | H02K 1/276 310/156.53 |
| 2008/0136280 A1* | 6/2008 | Hsiao | ...................... | F04B 35/04 310/114 |
| 2008/0224558 A1* | 9/2008 | Ionel | ...................... | H02K 1/276 310/156.57 |
| 2010/0011807 A1* | 1/2010 | Nam | ................... | F01C 21/0863 62/510 |
| 2012/0175989 A1* | 7/2012 | Mathoy | ................ | H02K 1/2766 310/156.53 |
| 2016/0172913 A1* | 6/2016 | Baba | ..................... | H02K 1/2766 417/410.3 |
| 2017/0070109 A1* | 3/2017 | Nigo | ...................... | H02K 21/16 |
| 2017/0098970 A1* | 4/2017 | Tsuchida | .............. | H02K 1/2706 |
| 2017/0110944 A1* | 4/2017 | Nigo | ...................... | H02K 21/16 |

FOREIGN PATENT DOCUMENTS

| | | |
|---|---|---|
| JP | H11-187597 A | 7/1999 |
| JP | 2001-037186 A | 2/2001 |
| JP | 2011-083168 A | 4/2011 |
| JP | 2012-217249 A | 11/2012 |

OTHER PUBLICATIONS

English machine translation of CN102222995; Oct. 2011; Wang et al.*

Office Action dated Jul. 4, 2017 issued in corresponding CN patent application No. 201380079865.5 (and English translation).

International Search Report of the International Searching Authority dated Nov. 5, 2013 for the corresponding International application No. PCT/JP2013/075849 (and English translation).

* cited by examiner

EMBEDDED PERMANENT MAGNET TYPE ELECTRIC MOTOR, COMPRESSOR, AND REFRIGERATION AIR-CONDITIONING DEVICE

CROSS REFERENCE TO RELATED APPLICATION

This application is a U.S. national stage application of PCT/JP2013/075849 filed on Sep. 25, 2013, the contents of which are incorporated herein by reference.

TECHNICAL FIELD

The present invention relates to an interior permanent magnet motor, a compressor, and a refrigeration and air conditioning apparatus.

BACKGROUND ART

In recent years, along with an increase in awareness of energy saving, there have been proposed a large number of permanent magnet motors using rare-earth permanent magnets having high coercivity in a rotor to realize high efficiency. However, the rare-earth permanent magnets are expensive, thus leading to increase in cost of the motor. Therefore, in a rotor of a related-art general interior permanent magnet motor, sintered ferrite magnets are used instead of the rare-earth permanent magnets. When the sintered ferrite magnets are used instead of the rare-earth permanent magnets as described above, a residual flux density, which represents a magnitude of a magnetic force, is reduced to about ⅓. Therefore, the area of a surface of each of the permanent magnets is increased to the extent possible to compensate for lack of torque due to the reduction in magnetic force. Further, a plurality of magnet insertion holes configured to embed the plurality of permanent magnets therein are formed in a rotor core. In a core portion on a contour side with respect to each of those permanent magnets, slits extending in a radial direction are formed so as to reduce an electromagnetic exciting force generated in the motor.

For example, in Patent Literature 1, the following rotor of the interior permanent magnet motor is disclosed. The rotor of the interior permanent magnet motor includes a laminated core and a shaft. The laminated core includes a plurality of arc-shaped permanent magnets and a plurality of punched holes configured to receive the permanent magnets therein. Each of the plurality of punched holes is formed for one pole. Further, each of the plurality of punched holes is arranged so that the convex portion side of the arc is directed toward the rotor center.

Further, in the interior permanent magnet motor disclosed in Patent Literature 2, in order to increase the magnetic-path resistance against a reaction magnetic flux from a stator, in a portion of the core, which is located at an outer periphery of each of the permanent magnets, a plurality of elongated slits extending substantially in a normal direction are formed to be arrayed in a direction perpendicular to the normal. Further, when viewed substantially in a direction perpendicular to the normal, an interval between each of the slits and an outer peripheral surface of the rotor core and an interval between each of the slits and the permanent magnet are set smaller than an interval between the slits and an interval between magnetic pole pieces of adjacent teeth of the stator.

Further, in the rotor of the interior permanent magnet motor disclosed in Patent Literature 3, a plurality of slits are formed so as to greatly enlarge a region in a magnetic pole center portion, which is formed only by a magnetic portion without slits.

CITATION LIST

Patent Literature

[PTL 1] JP 58-105779 U (mainly FIG. 1)
[PTL 2] JP 2001-037186 A (mainly FIG. 1)
[PTL 3] JP 2012-217249 A (mainly FIG. 7)

SUMMARY OF INVENTION

Technical Problem

In the interior permanent magnet motor disclosed in Patent Literature 1, each of the punched holes is arranged so that the convex portion side of the arc is directed toward the rotor center. Thus, the area of the surface of each of the permanent magnets can be increased to increase torque. However, when a shaft of the rotor is eccentrically assembled due to a factor of fluctuation in assembly or the like, there may arise a problem in that a magnetic flux generated by a current flowing through a coil of the stator attracts the rotor core so that the electromagnetic exciting force in the radial direction is increased, thus leading to increase in vibration and noise.

Further, the interior permanent magnet motor disclosed in Patent Literature 2 has structure in which the plurality of elongated slits are arrayed in the portion of the rotor core on the radially outer side with respect to each of the permanent magnets. Therefore, when the shaft of the rotor is eccentrically assembled due to the factor of fluctuation in assembly or the like, there may arise a problem in that an effect of reducing the electromagnetic exciting force in the radial direction is small, thus leading to the increase in vibration and noise.

Further, in the interior permanent magnet motor disclosed in Patent Literature 3, the region formed only by the magnetic portion is greatly enlarged in the magnetic pole center portion of the rotor core. Therefore, when the shaft of the rotor is eccentrically assembled due to the factor of fluctuation in assembly or the like, there may arise a problem in that the effect of reducing the electromagnetic exciting force in the radial direction is small, thus leading to the increase in vibration and noise.

The present invention has been made in view of the above, and has an object to provide an interior permanent magnet motor capable of suppressing vibration and noise that may be caused by an exciting force generated due to fluctuation in assembly while using arc-shaped permanent magnets that are convex toward a center side of a rotor.

Solution to Problem

In order to achieve the object described above, according to one embodiment of the present invention, there is provided an interior permanent magnet motor, including: a stator; and a rotor rotatably arranged so as to be opposed to the stator, in which the rotor includes a rotor core having a plurality of magnet insertion holes formed therein, into which corresponding permanent magnets are respectively inserted, in which the plurality of permanent magnets and the plurality of magnet insertion holes are each formed into an arc shape that is convex toward a center side of the rotor, in which a plurality of slits are formed between a rotor outer peripheral surface of the rotor and the radially-outer insertion hole contour surface of each of the magnet insertion holes, and in which, assuming that a total area of the plurality of slits per magnetic pole is represented by Ss, and an area of a region in the rotor core on a radially outer side with respect to corresponding one of the magnet insertion holes is represented by Si, the plurality of slits are formed so as to satisfy a relationship of $0.35 \leq Ss/Si \leq 0.5$.

The plurality of slits may include at least one magnetic pole center slit and a plurality of side slits, and a width of the magnetic pole center slit may be set smaller than a width of each of the side slits.

Intervals of the plurality of slits may be set equal to each other.

It is preferred that the permanent magnets be ferrite magnets.

Further, in order to achieve the same object, according to one embodiment of the present invention, there is also provided a compressor. The compressor of the one embodiment of the present invention includes, in an airtight container: a motor; and a compression element. The motor is the above-mentioned interior permanent magnet motor of the one embodiment of the present invention.

Further, in order to achieve the same object, according to one embodiment of the present invention, there is also provided a refrigeration and air conditioning apparatus. The refrigeration and air conditioning apparatus of the one embodiment of the present invention includes the above-mentioned compressor of the one embodiment of the present invention as a component of a refrigeration cycle.

Advantageous Effects of Invention

According to the one embodiment of the present invention, it is possible to suppress vibration and noise that may be caused by a magnetic attraction force in the radial direction, which is generated due to fluctuation in assembly, while using the arc-shaped permanent magnets that are convex toward the center side of the rotor.

DESCRIPTION OF EMBODIMENTS

Now, embodiments of the present invention are described referring to the accompanying drawings. Note that, in the drawings, the same reference symbols represent the same or corresponding parts. Note that, FIG. 2 to FIG. 6 are all partially enlarged views extracting a part from an entire configuration in the illustration of FIG. 1, and for the sake of clarity of illustration, the hatching is omitted.

First Embodiment

Figure 1:
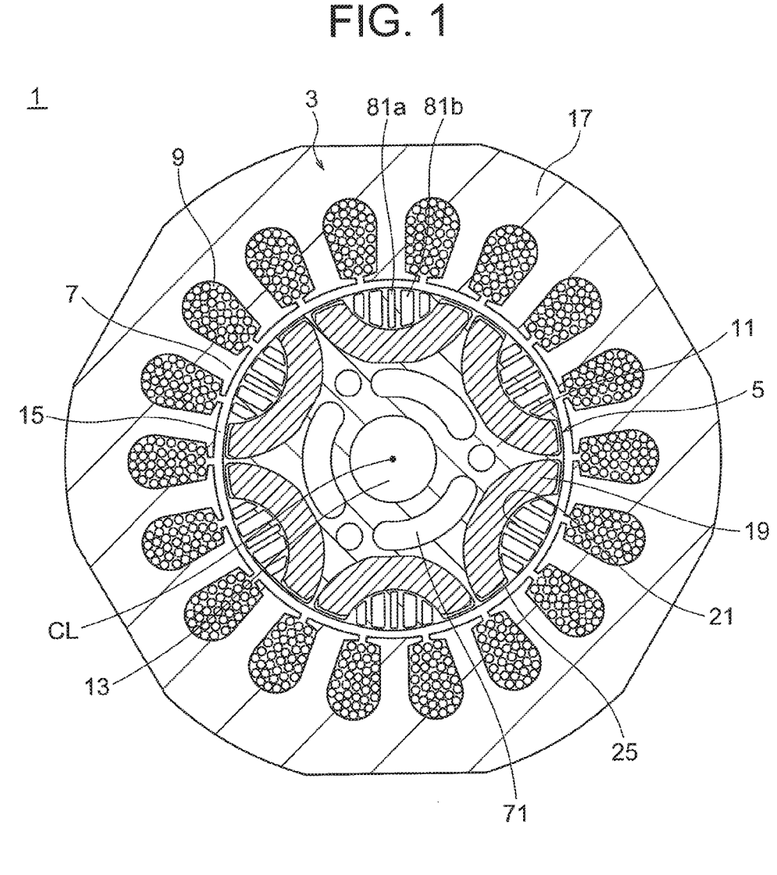
FIG. 1 is a view for illustrating a cross-section orthogonal to a rotation center line of an interior permanent magnet motor according to a first embodiment of the present invention.
Figure 2:
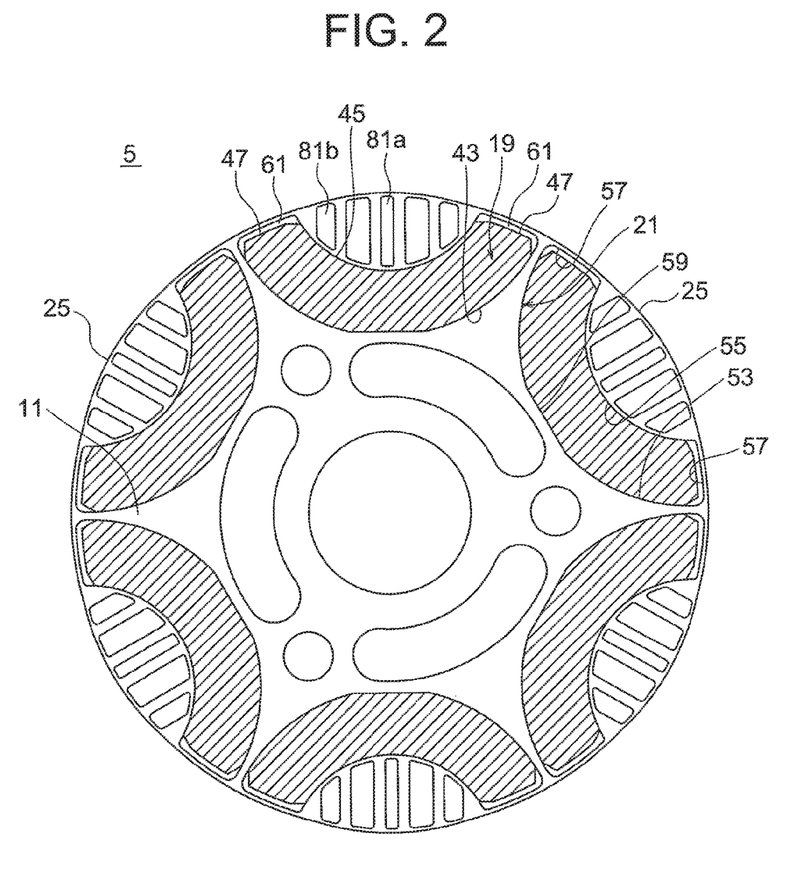
FIG. 2 is a view for illustrating a rotor alone in FIG. 1 in an enlarged manner.
Figure 3:
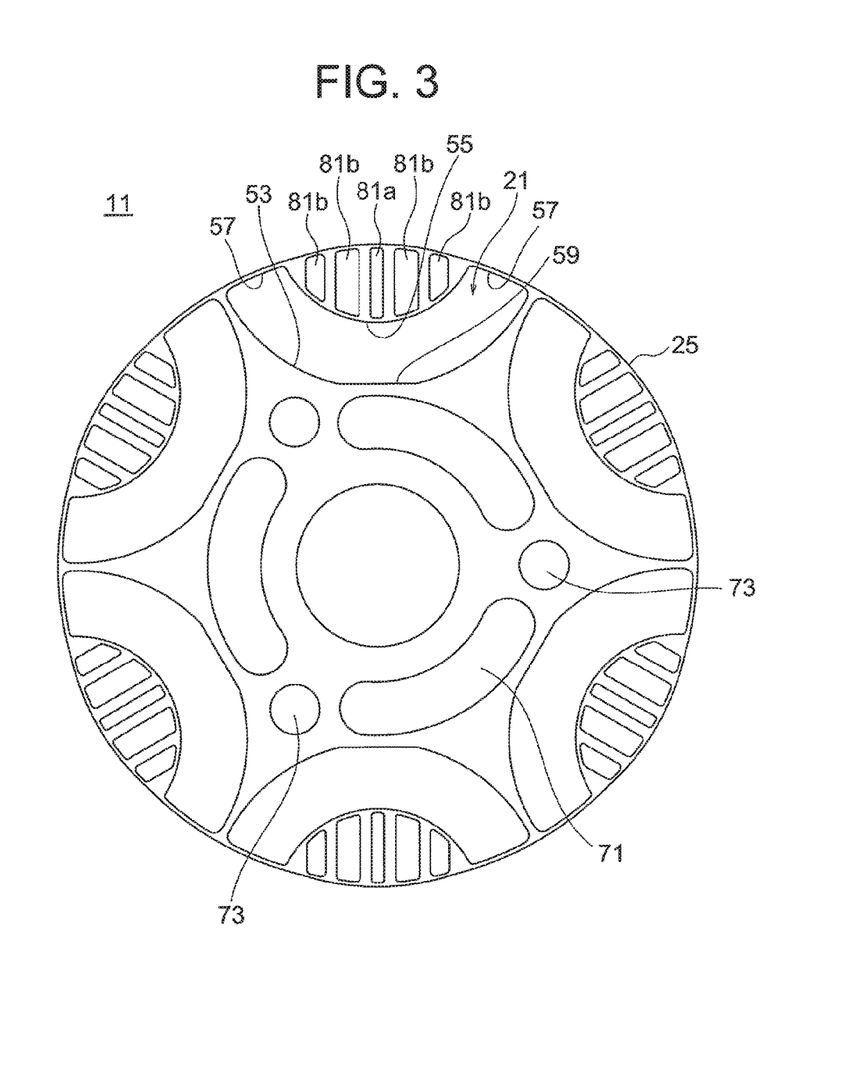
FIG. 3 is a sectional view for illustrating a state in which permanent magnets are not set in magnet insertion holes in FIG. 2.
Figure 4:
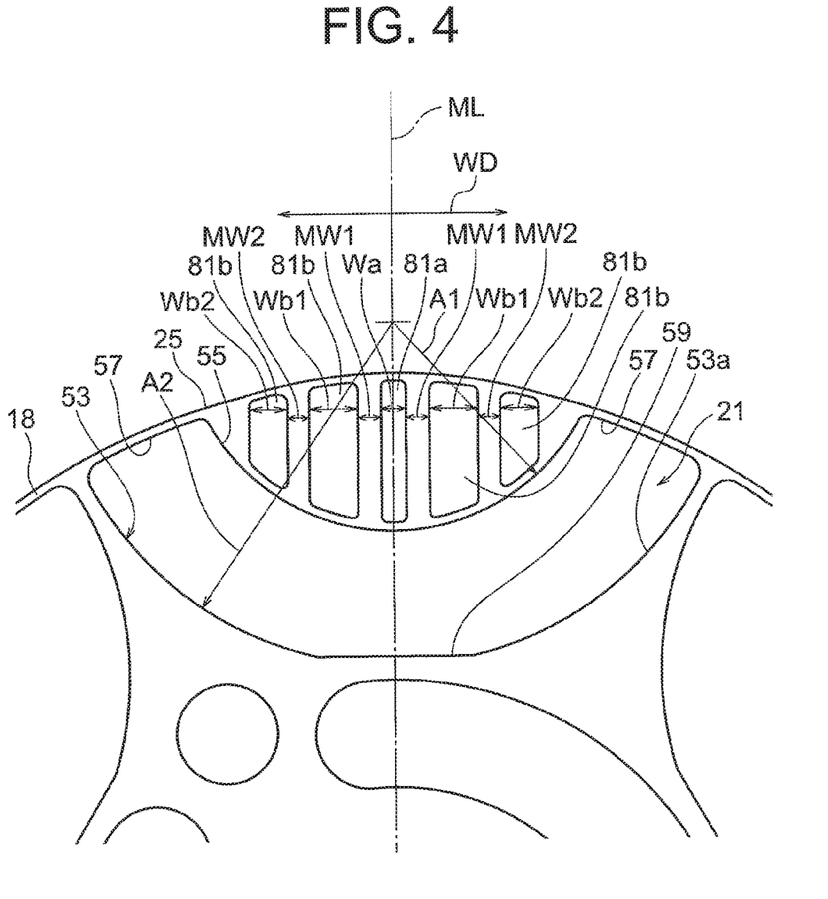
FIG. 4 is a view for illustrating a peripheral part of one magnet insertion hole in FIG. 3 in an enlarged manner.

FIG. 1 is a view for illustrating a cross-section orthogonal to a rotation center line of an interior permanent magnet motor according to a first embodiment of the present invention. FIG. 2 is a view for illustrating a rotor alone in FIG. 1 in an enlarged manner. FIG. 3 is a sectional view for illustrating a state in which permanent magnets are not set in magnet insertion holes in FIG. 2. FIG. 4 is a view for illustrating a peripheral part of one magnet insertion hole in FIG. 2 in an enlarged manner.

An interior permanent magnet motor 1 includes a stator 3 and a rotor 5 rotatably arranged so as to be opposed to the stator. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A stator winding 3a is wound around each of the plurality of tooth portions 7 by, for example, a distributed winding method. Note that, the present invention is not limited thereto, and a stator including windings of a concentrated winding method may be used.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor 5 and an inner peripheral surface of the stator 3.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5.

Next, configurations of the stator 3 and the rotor 5 are described in detail. The stator 3 includes a stator core 17. The stator core 17 is formed by punching magnetic steel plates into a predetermined shape, and laminating a predetermined number of the magnetic steel plates while fastening the magnetic steel plates by caulking.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by punching magnetic steel plates into a predetermined shape, and laminating a predetermined number of the magnetic steel plates while fastening the magnetic steel plates by caulking. Inter-pole thin portions 18 having a uniform thickness are each secured between a rotor outer peripheral surface 25 and a side-end insertion hole contour surface 57 described later. Those inter-pole thin portions 18 each serve as a path for a leakage magnetic flux between the adjacent magnetic poles, and hence it is preferred that the inter-pole thin portion 18 have a thickness as small as possible.

A plurality of permanent magnets 19, which are magnetized so that the N poles and the S poles are alternately positioned, are arranged in the rotor core 11. Referring to FIG. 1, each of the permanent magnets 19 is formed of a sintered ferrite magnet, curved into an arc shape, and arranged so that a convex portion side of the arc shape faces the center side of the rotor 5. In more detail, magnet insertion holes 21 as many as the number of the plurality of permanent magnets 19 are formed in the rotor core 11. The corresponding permanent magnets 19 are inserted into a plurality of the magnet insertion holes 21, respectively. That is, the plurality of permanent magnets 19 and the plurality of magnet insertion holes 21 are each formed into an arc shape that is convex toward the center side of the rotor 5. Further, as illustrated in FIG. 1, one permanent magnet 19 is inserted into one magnet insertion hole 21. Note that, the number of magnetic poles of the rotor 5 may be any number as long as the number is two or more.

Next, details of the permanent magnets and the magnet insertion holes are described. The permanent magnets 19 each have a radially-inner magnet contour surface 43, a radially-outer magnet contour surface 45, and a pair of side-end magnet contour surfaces 47. Further, the magnet insertion holes 21 each have a radially-inner insertion hole contour surface 53, a radially-outer insertion hole contour surface 55, and a pair of side-end insertion hole contour surfaces 57. The radially-outer insertion hole contour surface 55 is formed by a first arc surface having a first arc radius A1. On the other hand, the radially-inner insertion hole contour surface 53 is formed by a straight surface 59 and a second arc surface 53a having a second arc radius A2.

The first arc radius A1 and the second arc radius A2 have a common radius center, and the common radius center is located on the radially outer side with respect to the magnet insertion hole 21 and on a corresponding magnetic pole center line ML. In other words, the radially-inner insertion hole contour surface 53 and the radially-outer insertion hole contour surface 55 are formed concentrically. The center of the first arc surface and the center of the second arc surface coincide with an orientation center (orientation focal point) of the permanent magnet.

When viewed in the cross-section having the rotation center line CL of the rotor 5 as the normal as in FIG. 4, the straight surface 59 extends along a virtual base plane orthogonal to the magnetic pole center line ML. That is, the straight surface 59 is formed in a direction orthogonal to the corresponding magnetic pole center line ML.

As illustrated in FIG. 2, under a state in which the permanent magnet 19 is inserted into the corresponding magnet insertion hole 21, air gap portions 61 are formed each between the side-end magnet contour surface 47 and the side-end insertion hole contour surface 57. Further, the radially-outer magnet contour surface 45 and the radially-outer insertion hole contour surface 55 are held in contact with each other, and the radially-inner magnet contour surface 43 and the radially-inner insertion hole contour surface 53 are held in contact with each other. Further, when viewed in the cross-section having the rotation center line CL of the rotor 5 as the normal, the permanent magnet 19 and the magnet insertion hole 21 are each formed to be line symmetric across the corresponding magnetic pole center line ML.

On a radially inner side of the rotor core 11 with respect to the magnet insertion holes 21, in particular, on a radially inner side of the rotor core 11 with respect to the straight surfaces 59, there is formed at least one air hole (plurality of air holes 71 in the illustrated example) configured to allow a refrigerant and an oil to pass therethrough when the interior permanent magnet motor is mounted on a compressor. Note that, reference symbol 73 denotes a rivet hole. The air holes 71 and the rivet holes 73 are alternately arrayed in the circumferential direction, and the air holes 71 and the rivet holes 73 are arrayed equiangularly. Each of the air holes 71 and the rivet holes 73 is positioned in a corresponding inter-pole portion.

In the illustrated example, three air holes 71 are arc-shaped elongated holes that are convex toward the radially-inner insertion hole contour surfaces 53 of the magnet insertion holes 21. The three air holes 71 are arranged on the same circumference about the rotor center so as to be separated equiangularly. Each of the elongated holes is arranged across radially inner parts of corresponding two magnet insertion holes 21 to attain a configuration in which the air hole 71 is positioned on the radially inner side (on the magnetic pole center line) with respect to the straight surface 59 of each of all the magnet insertion holes 21 (that is, a straight surface of each of the permanent magnets 19, which corresponds to the straight surface 59).

At least one magnetic pole center slit and a plurality of side slits are formed between the rotor outer peripheral surface 25 of the rotor 5 and the radially-outer insertion hole contour surface 55 of each of the magnet insertion holes 21. The magnetic pole center slit is arranged at a corresponding magnetic pole center, and the plurality of the side slits are formed so that at least one side slit is formed on each of both sides of the magnetic pole center slit in a width direction. As a specific example, in the first embodiment, one magnetic pole center slit 81a is arranged on the corresponding magnetic pole center line ML, and two side slits 81b are formed on one side of the magnetic pole center slit in the width direction, specifically, a total of four side slits 81b are formed. Note that, regarding the width direction, for each magnetic pole corresponding to a component part of an object, a direction orthogonal to the corresponding magnetic pole center line ML is defined as a width direction WD. The one magnetic pole center slit 81a and the four side slits 81b all extend in a direction parallel to the corresponding magnetic pole center line ML (lengthwise direction). The one magnetic pole center slit 81a and the four side slits 81b are formed to be line symmetric across the corresponding magnetic pole center line ML.

When viewed in the cross-section having the rotation center line CL of the rotor 5 as the normal, the area of the magnetic pole center slit 81a is smaller than the area of each of the four side slits 81b.

Further, intervals between end portions of the respective side slits 81b in the lengthwise direction and the rotor outer peripheral surface 25 or the radially-outer insertion hole contour surface 55 are set to be approximately equal among the four side slits 81b. Further, an interval between the rotor outer peripheral surface 25 and the radially-outer insertion hole contour surface 55 is reduced as being away from the magnetic pole center line ML in the width direction. Therefore, regarding lengths of the four side slits 81b, as a relative relationship, the side slits 81b closer to the magnetic pole center line ML are formed longer than the side slits 81b farther from the magnetic pole center line ML.

Further, regarding widths of the four side slits 81b, as a relative relationship, widths Wb1 of the side slits 81b closer to the magnetic pole center line ML are larger than widths Wb2 of the side slits 81b farther from the magnetic pole center line ML. Further, a width Wa of the magnetic pole center slit 81a is smaller than each of the widths Wb1 and Wb2 of the side slits 81b. Therefore, in other words, in the first embodiment, the widths of the plurality of slits formed in the region between the rotor outer peripheral surface 25 and the radially-outer insertion hole contour surface 55 are three types of the width Wa, the width Wb1, and the width Wb2, that is, the widths of the plurality of slits have a nonuniform relationship.

Further, assuming that an interval between the adjacent magnetic pole center slit 81a and side slit 81b (magnetic-path width) is represented by MW1, and an interval between the adjacent side slits 81b (magnetic-path width) is represented by MW2, each of the widths Wb1 and Wb2 of the side slits 81b is larger than the interval MW1 between the adjacent magnetic pole center slit 81a and side slit 81b, and is larger than the interval MW2 between the adjacent side slits 81b. Further, in the first embodiment, the intervals between the plurality of slits formed in the region between the rotor outer peripheral surface 25 and the radially-outer insertion hole contour surface 55 are equal, that is, a relationship of interval (magnetic-path width) MW1=interval (magnetic-path width) MW2 is satisfied.

Figure 5:
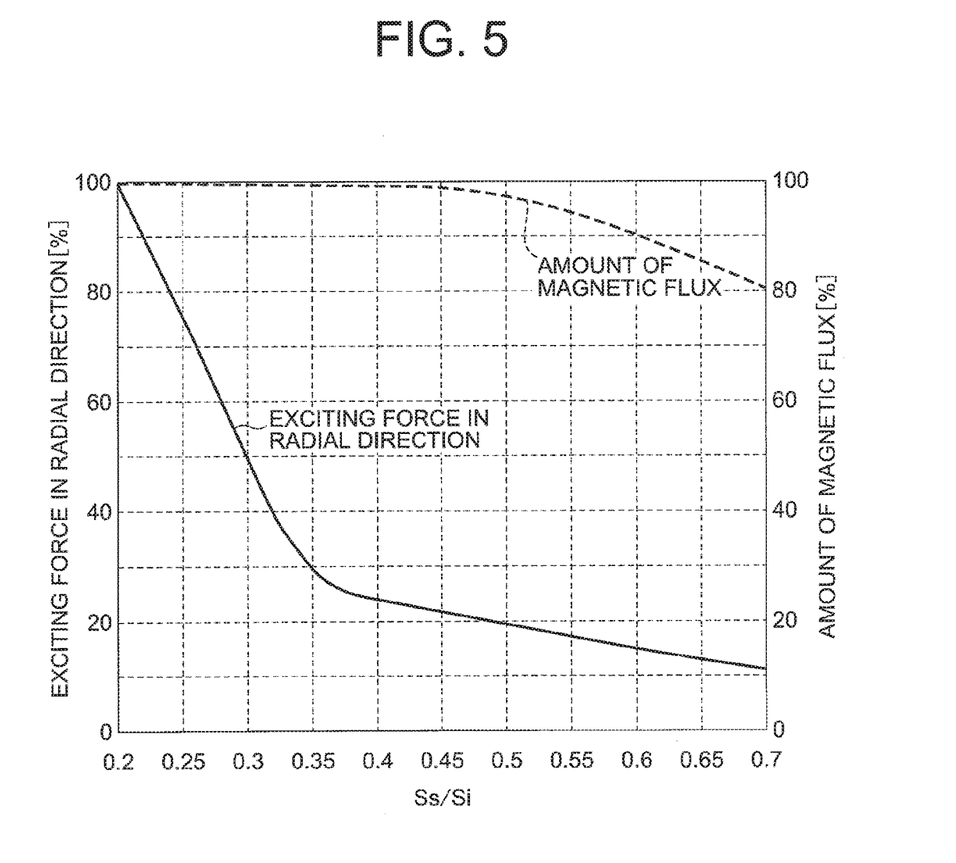
FIG. 5 is a graph for showing characteristics of the motor according to the first embodiment.
Figure 6:
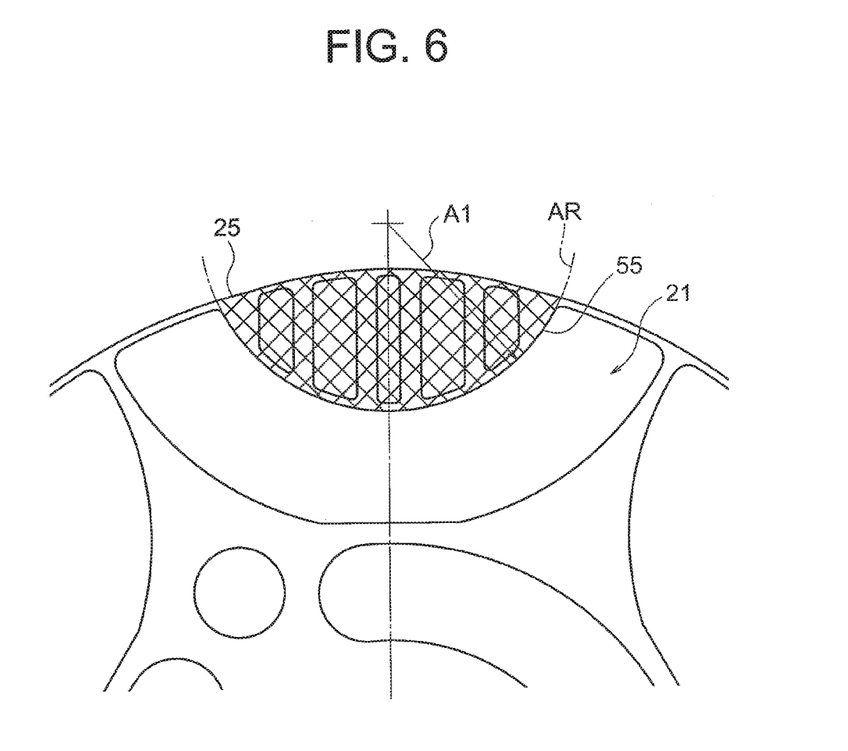
FIG. 6 is a view for illustrating an area Si of a region on a radially outer side.

Next, a mode of forming the slits according to the first embodiment is described. Although description is given in detail below, in the first embodiment, the plurality of slits are formed for each magnetic pole so as to satisfy a relationship of $0.35 \leq Ss/Si \leq 0.5$. For this matter, description is given referring to FIG. 5. The horizontal axis in FIG. 5 represents Ss/Si, and the vertical axis represents an electromagnetic exciting force in the radial direction and an amount of the magnetic flux linked with a coil. Both the electromagnetic exciting force and the amount of the magnetic flux are shown in terms of a ratio when a reference (100%) is set to a case where the slits are not formed in the rotor core.

Ss in the horizontal axis denotes a total area of the plurality of slits per magnetic pole, that is, a total area of the plurality of slits formed between the rotor outer peripheral surface 25 of the rotor 5 and the radially-outer insertion hole contour surface 55 of each of the magnet insertion holes 21. More specifically, in the first embodiment, Ss denotes a total area of the area of one magnetic pole center slit 81a and the areas of the four side slits 81b. On the other hand, Si in the horizontal axis denotes the area of a region in the rotor core on the radially outer side with respect to each of the magnet insertion holes. More specifically, Si denotes the area of a region indicated by a pattern of crossing lines in FIG. 6, specifically, the area of a region simply surrounded by, ignoring the presence of the slits, an arc AR of the first arc radius A1, which defines the radially-outer insertion hole contour surface 55, and the rotor outer peripheral surface 25.

In the graph of FIG. 5, the solid line indicates the exciting force in the radial direction. Among radial direction components, the order of a pole-number component (sixth-order component in this embodiment) is harmonically analyzed and extracted, and the resultant value is plotted as a representative value. It is shown that vibration and noise can be reduced as the value of the exciting force in the radial direction is reduced. Further, in the graph of FIG. 5, the broken line indicates the amount of the magnetic flux, which is plotted with a reference being set to an effective value of an induced voltage when the slits are not formed in the rotor core. It is shown that a motor current can be reduced as the amount of the magnetic flux is increased, which is advantageous in motor efficiency.

As understood from FIG. 5, the exciting force in the radial direction has an inflection point at Ss/Si=0.35. When Ss/Si is less than 0.35, there is ample room to reduce the exciting force in the radial direction. When Ss/Si is 0.35, the exciting force in the radial direction is reduced to about 30% of the case where the slits are not formed, and when Ss/Si is 0.35 or more, the exciting force in the radial direction is merely shown as being gently reduced. That is, it is understood that, when Ss/Si is 0.35 or more, an effect of reducing the exciting force in the radial direction is sufficiently obtained. On the other hand, the amount of the magnetic flux has an inflection point at Ss/Si=0.5. When Ss/Si exceeds 0.5, reduction of the amount of the magnetic flux is clearly observed, and the motor efficiency is significantly degraded. In view of the above, in the first embodiment, the plurality of slits are formed so as to satisfy the relationship of $0.35 \leq Ss/Si \leq 0.5$. In this manner, the reduction of the amount of the magnetic flux is avoided while significantly reducing the exciting force so that the degradation of the efficiency can be suppressed.

Next, advantages of the interior permanent magnet motor according to the first embodiment, which is constructed as described above, are described. In the rotor in which the arc-shaped permanent magnets are arranged in the rotor core so that the convex portion sides face the center side of the rotor, the surface of each magnet is curved into an arc shape. Thus, the area of the surface of each magnet can be increased to increase the amount of the magnetic flux generated from the permanent magnets. Thus, the current to be applied to the motor can be reduced, thereby being capable of attaining the highly efficient motor or reducing the volume of the motor. In particular, when the ferrite magnets are used as the permanent magnets to be embedded in the rotor, cost can be reduced as compared to the case of rare-earth magnets. On the other hand, there is a problem in that a residual magnetic flux density may be reduced to cause lack of torque. In view of this problem, as described above, the arc-shaped permanent magnets are arranged in the rotor core so that the convex portion sides face the center side of the rotor. Thus, the area of the surface of each magnet can be secured, and the lack of torque can also be avoided while reducing the cost. Further, in the rotor, the arc-shaped permanent magnets are arranged so that the convex portion sides face the center side of the rotor. Thus, the lack of torque can be avoided. However, when the shaft of the rotor is eccentrically assembled into the stator due to a factor of fluctuation in assembly or the like, there may arise a problem in that the magnetic flux generated by a current flowing through the coil of the stator attracts the rotor core so that the electromagnetic exciting force in the radial direction is increased, thus leading to increase in vibration and noise. In view of this problem, in the first embodiment, that is, while using the arc-shaped permanent magnets that are convex toward the center side of the rotor to secure torque, the plurality of slits are formed so as to satisfy the relationship of $0.35 \leq Ss/Si \leq 0.5$. Therefore, the exciting force that may be generated due to the factor of fluctuation in assembly or the like is reduced while avoiding the degradation of the efficiency. Thus, it is possible to provide the interior permanent magnet motor capable of suppressing vibration and noise.

Second Embodiment

Figure 7:
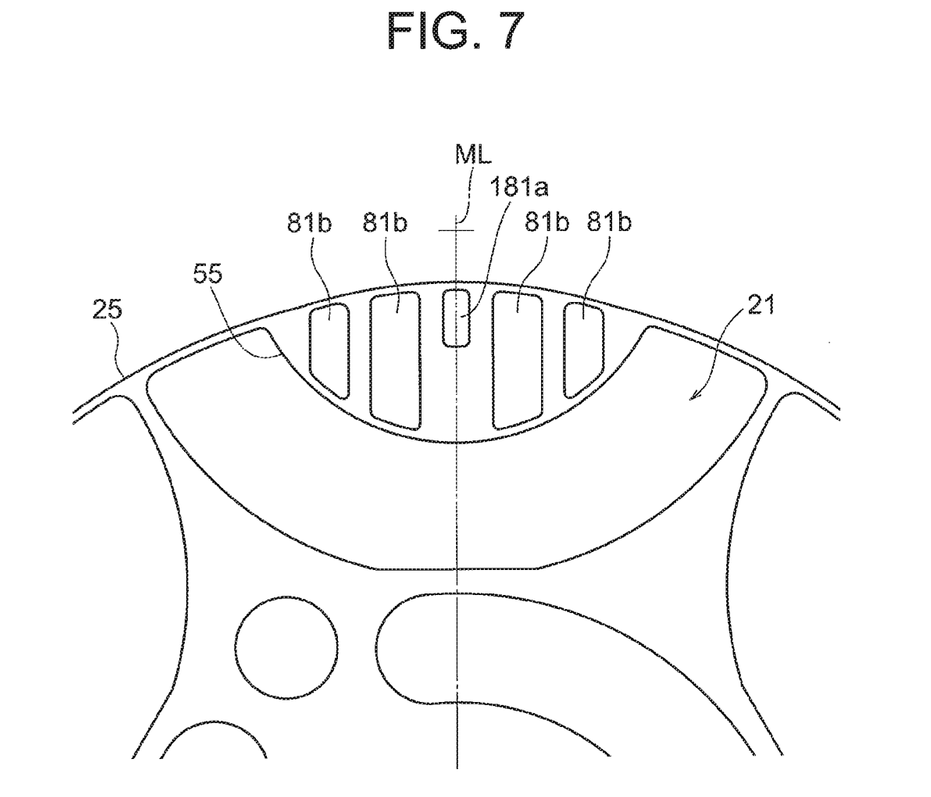
FIG. 7 is a view according to a second embodiment of the present invention in the same manner as that of FIG. 4.

Next, an interior permanent magnet motor according to a second embodiment of the present invention is described. FIG. 7 is a view according to the second embodiment of the present invention in the same manner as that of FIG. 4. Note that, the second embodiment has the same configuration as that of the above-mentioned first embodiment except for portions described below.

The second embodiment corresponds to a mode in which the magnetic pole center slit is formed shorter than each of the side slits in the above-mentioned first embodiment. In other words, in the second embodiment, the length of each of the four side slits 81b is larger than a length of a magnetic pole center slit 181a. Further, the magnetic pole center slit 181a is arranged closer to the rotor outer peripheral surface 25, and is formed closer to the rotor outer peripheral surface 25 than the radially-outer insertion hole contour surface 55. Also in the second embodiment described above, the four side slits 81b and the one magnetic pole center slit 181a are formed so as to satisfy the relationship of 0.35≤Ss/Si≤0.5. With this, while using the arc-shaped permanent magnets that are convex toward the center side of the rotor, vibration and noise that may be caused by the exciting force generated due to the fluctuation in assembly can be suppressed.

Third Embodiment

Next, as a third embodiment of the present invention, there is described a rotary compressor having the interior permanent magnet motor according to the above-mentioned first or second embodiment mounted therein. Note that, the present invention encompasses a compressor having the interior permanent magnet motor according to the above-mentioned first or second embodiment mounted therein. However, the type of the compressor is not limited to the rotary compressor.

Figure 8:
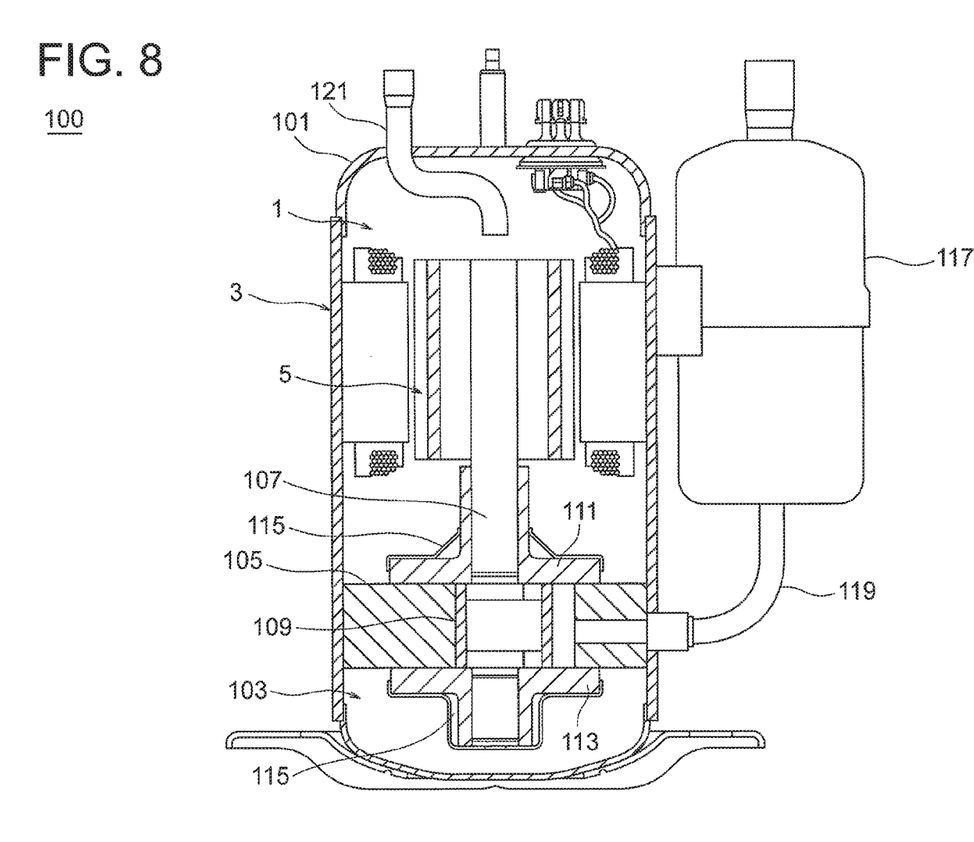
FIG. 8 is a vertical sectional view of a rotary compressor having the interior permanent magnet motor mounted therein according to a third embodiment of the present invention.

FIG. 8 is a vertical sectional view of the rotary compressor having the interior permanent magnet motor mounted therein. A rotary compressor 100 includes the interior permanent magnet motor 1 (motor element) and a compression element 103 in an airtight container 101. Although not illustrated, a refrigerating machine oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as a shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion and which are configured to close axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. The coil of the stator 3 is supplied with power from a glass terminal fixed to the airtight container 101.

The rotor 5 is arranged through intermediation of an air gap on the radially inner side of the stator 3, and is held in a rotatable state by the bearing portions (upper frame 111 and lower frame 113) of the compression element 103 via the rotary shaft 107 (shaft 13) in the center portion of the rotor 5.

Next, an operation of the rotary compressor 100 is described. A refrigerant gas supplied from an accumulator 117 is taken into the cylinder 105 through an intake pipe 119 fixed to the airtight container 101. The interior permanent magnet motor 1 is rotated by energization of an inverter so that the piston 109 fitted to the rotary shaft 107 is rotated in the cylinder 105. With this, the refrigerant is compressed in the cylinder 105. The refrigerant, which has passed through the muffler 115, rises in the airtight container 101. At this time, the refrigerating machine oil is mixed into the compressed refrigerant. When the mixture of the refrigerant and the refrigerating machine oil passes through the air holes 71 formed in the rotor core 11, the refrigerant and the refrigerating machine oil are promoted to be separated from each other, and hence the refrigerating machine oil can be prevented from flowing into a discharge pipe 121. In this manner, the compressed refrigerant is supplied on a high-pressure side of the refrigeration cycle through the discharge pipe 121 arranged on the airtight container 101.

Note that, as the refrigerant for the rotary compressor 100, R410A, R407C, R22, or the like that has hitherto been used may be used, but any refrigerant such as a refrigerant having a low global warming potential (GWP) can also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Also in the rotary compressor according to the third embodiment, which is constructed as described above, advantages similar to the advantages of the first or second embodiment described above are obtained.

Fourth Embodiment

Further, the present invention may be carried out as a refrigeration and air conditioning apparatus including the compressor according to the above-mentioned third embodiment as a component of a refrigeration cycle. Note that, configurations of components other than the compressor of the refrigeration cycle of the refrigeration and air conditioning apparatus are not particularly limited.

In the above, the details of the present invention are specifically described referring to the preferred embodiments. However, it is apparent to those skilled in the art that various modifications may be made based on the basic technical concept and the teachings of the present invention.

REFERENCE SIGNS LIST 1 interior permanent magnet motor, 3 stator, 5 rotor, 11 rotor core, 19 permanent magnet, 21 magnet insertion hole, 25 rotor outer peripheral surface, 53 radially-inner insertion hole contour surface, 55 radially-outer insertion hole contour surface, 57 side-end insertion hole contour surface, 81a, 181a magnetic pole center slit, 81b side slit, 100 rotary compressor, 101 airtight container, 103 compression element, 105 cylinder, CL rotation center line, ML magnetic pole center line

The invention claimed is:
1. An interior permanent magnet motor, comprising:
a stator; and a rotor rotatably arranged so as to be opposed to the stator, wherein the rotor comprises a rotor core having a plurality of magnet insertion holes formed therein, into which corresponding permanent magnets are respectively inserted, wherein the plurality of permanent magnets and the plurality of magnet insertion holes are each formed into an arc shape that is convex toward a center side of the rotor, wherein a plurality of slits are formed between a rotor outer peripheral surface of the rotor and a radially-outer insertion hole contour surface of each of the magnet insertion holes, and wherein, a total area of the plurality of slits per magnetic pole is represented by Ss, and an area of a region in the rotor core on a radially outer side with respect to corresponding one of the magnet insertion holes is represented by Si, the plurality of slits are formed so as to satisfy a relationship of $0.35 \leq Ss/Si \leq 0.5$, wherein the plurality of slits comprise at least one magnetic pole center slit and a plurality of side slits, wherein a circumferential width of the magnetic pole center slit is smaller than a circumferential width of each of the side slits, and wherein the circumferential width of the side slits closer to a magnetic pole center line are larger than the circumferential width of the side slits farther from the magnetic pole center line.

2. An interior permanent magnet motor according to claim 1, wherein intervals of the plurality of slits are equal to each other.

3. A compressor, comprising, in an airtight container:
   a motor; and
   a compression element,
   wherein the motor comprises the interior permanent magnet motor of claim 1.

4. A refrigeration and air conditioning apparatus, comprising the compressor of claim 3 as a component of a refrigeration cycle.

5. An interior permanent magnet motor according to claim 1, further wherein
   all of intervals between adjacent slits of the plurality of slits are equal to each other, and
   each of the circumferential widths of the side slits is larger than each of the intervals between the adjacent slits.

* * * * *